United States Patent [19]

Soderberg

[11] 4,164,962
[45] Aug. 21, 1979

[54] CONTROL VALVE FOR PARALLEL FLOWS

[75] Inventor: Nils-Eirk Soderberg, Finspong, Sweden

[73] Assignee: Stal-Laval Turbin AB, Finspong, Sweden

[21] Appl. No.: 843,380

[22] Filed: Oct. 19, 1977

[30] Foreign Application Priority Data

Oct. 20, 1976 [SE] Sweden .................................. 7611621

[51] Int. Cl.² .............................................. F16K 11/07
[52] U.S. Cl. ................................. 137/862; 137/625.3; 239/574
[58] Field of Search ..................... 137/614.11, 625.12, 137/625.3, 862; 239/562, 574

[56] References Cited

U.S. PATENT DOCUMENTS

| 817,153 | 4/1906 | Barr | 137/625.3 |
| 4,027,699 | 6/1977 | Anderson et al. | 137/625.37 |

*Primary Examiner*—Gerald A. Michalsky
*Attorney, Agent, or Firm*—Pollock, Vande Sande & Priddy

[57] ABSTRACT

A control valve for connecting a plurality of fluid demand locations with a common source while assuring a constant distribution regardless of differences in absolute magnitudes and counter pressures. The control valve comprises a main regulating valve for the total flow, coupled to a second valve comprising parallel valves corresponding to the respective demand locations.

7 Claims, 3 Drawing Figures

CONTROL VALVE FOR PARALLEL FLOWS

SUMMARY OF THE INVENTION

The present invention relates to a control valve for connecting a number of fluid demand locations to a common fluid source. The valve is intended to control the flows to such fluid demand locations which comprise a throttling means, for example a nozzle, downstream of each outlet from the valve, and an object of the invention is to assure constant distribution over the various flows independent of their absolute magnitudes, particularly in the case of rather small flows, independent of different counter pressures on the different valve outlets. The valve is designed to be arranged between the demand locations and a common fluid source.

The control valve according to the invention may be used, for example, in the fuel system for a combustion chamber, e.g., for a gas turbine, in which case the demand locations may be a plurality of burners with throttling means in the form of fuel nozzles. When such a combustion chamber is started, the burners must normally be provided with a small but equal quantity of fuel, irrespective of whether the burners are positioned at different heights and therefore provide different counter pressures.

According to the invention, this object is achieved by coupling together two series-connected regulating valves. This permits the parallel demand locations to be controlled individually when the opening is small, while the control will act on the collected flow when the opening is larger.

BRIEF DESCRIPTION OF THE DRAWINGS

The invention will now be described in greater detail with reference to the accompanying drawing, in which.

DESCRIPTION OF A PREFERRED EMBODIMENT

Figure 1:
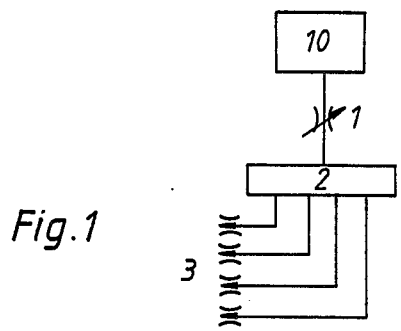
FIG. 1 is a schematic diagram showing the connection of a control valve according to the invention.

FIG. 1 shows a feed device 10, e.g., a fuel pump, two series-connected control valves 1 and 2 according to the invention and a number of demand locations 3, e.g., burners.

Figure 2:
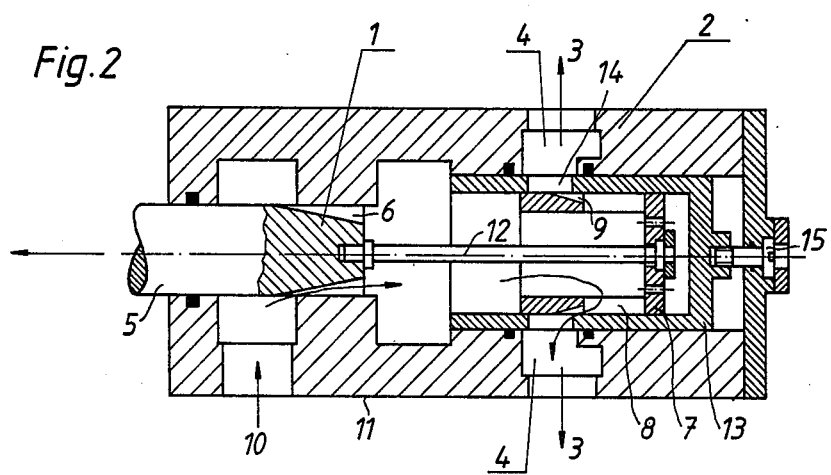
FIG. 2 shows an embodiment of a control valve according to the invention in axial section.

As shown in FIG. 2, the control valve can be constructed as two sliding valves 1 and 2 coupled together, the first sliding valve being connected to the inlet from the feed device 10, the second sliding valve having parallel outlets 4 to the demand locations 3. The valve is provided with an operating member in the form of a spindle 5 which is controlled by an operating device (not shown), e.g., an hydraulic device. The valves are located in a common valve housing 11.

Valve 1 is designed as a sliding valve, the piston of which consists of an extension of the spindle 5 which is provided at its end with a number of bevel cut slots 6 so that a displacement of the piston 5 to the left results in an increasing through-flow area in the valve.

Valve 2 is also designed as a sliding valve with a hollow, cylindrical piston or slide 7 with a number of radial openings 8 corresponding to the openings 4 of the valve housing 11 for the connections to the different demand location 3. Only the openings 4 positioned in the shown section are shown. The other openings are distributed along the circumference of the valve housing.

At the left-hand end of the radial openings 8, these openings successively change into bevel cut slots 9, approximately corresponding to the slots 6 in the piston 5.

The piston 5 for valve 1 and the piston 7 for valve 2 are mechanically coupled together through a rod 12, possibly of adjustable length.

When pistons 5 and 7 are moved to their extreme right-hand position, the control valve is closed, and at least slots 9 in piston 7 are then completely covered by the wall of the valve housing. Depending on the relative locations of valves 1 and 2, slots 6 may be completely covered or their left-hand ends may open to a limited extent.

When the pistons are moved to the left, first slots 6 in valve 1 and successively also slots 9 in valve 2 will open. The mutual adjustment of the valves, e.g., by means of rod 12, will then be such that up to a certain low opening degree, preferably corresponding to the area of slots 9, the total area in valve 1 exceeds the total area in valve 2.

The principle in this connection is that as long as the through-flow area of the control valve is lower than the total area of the demand locations, the pressure drops in the system will mainly be applied across the control valve. If the control were to be applied only to the common flow, i.e., by means of valve 1, the distribution of the flow between the demand locations would be responsive to the pressure differentials between the latter, e.g., due to different levels. By arranging individual regulation of the flows by means of valve 2 and concentrating the pressure drop on this valve, i.e., on a location where all the flows are at the same level, an uneven distribution between the flows is avoided. Then, when the through-flow area of the control valve as its opening increases becomes greater than the demand locations 3, the largest pressure drop is moved to the throttling means of said locations 3, whereafter the other pressure drops may be disregarded and regulation be performed on the common flow.

Figure 3:
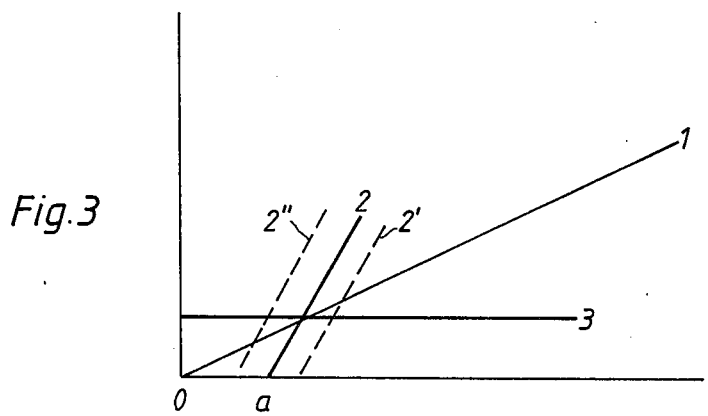
FIG. 3 shows in diagram form the relationship between the different through-flow areas and the degree of opening of the valve.

This fact is illustrated with the help of the diagram in FIG. 3, in which the abscissa indicates the opening degree of the assembled control valve and the ordinate indicates the different through-flow areas.

Line 1 indicates the area of valve 1, line 2 the total area of all openings of valve 2 and line 3 the total area of demand locations 3. This latter area is constant.

As mentioned earlier, the closing position of the control valve may be somewhere between points O and A.

At point A, valve 2 starts opening and, since slots 9 are much shorter than slots 6, valve 2 opens faster than valve 1 which, on the other hand, is already open to some extent. As mentioned, however, the area of valve 2 should not reach the same size as the area of valve 1 until the control valve has attained the same area as demand locations 3.

For the above reason, valve 2 can suitably be provided with an adjusting device in the form of a slide 13 between valve housing 11 and piston 7. Slide 13 is provided with radial openings 14 right opposite to openings 4 in the valve housing. Further, slide 13 is provided with an adjusting screw 15 by which the slide can be displaced forward and backward, thus controlling the adjustment between slots 9 in slide 7 and the right-hand edge of holes 14.

Displacement of slide 13 to the left results in later opening of valve 2, represented in FIG. 3 by line 2 approaching broken line 2'. This means that valve 1 will not assume the control until the pressure drop in the system has been well transmitted from valve 2 to demand locations 3, which is quite permissible. On the other hand, displacement of slide 13 to the right is represented in FIG. 3 by line 2 approaching broken line 2", i.e., valve 1 assumes control before the pressure drop in demand locations 3 has reached the desired level. The regulation of the common flow will then work towards too low a counter pressure, so that any differences in the flow paths to demand locations 3 will influence the flow distribution to an undesired extent.

The embodiment of the control valve shown in FIG. 2 may be varied in many ways. For example, the reciprocating slides 5, 7 and 13 may be rotatable about the longitudinal axis, in which case slots 6 and 9 must be changed to peripheral slots. In the embodiment according to FIG. 2, slots 6 and 9 could alternatively be provided in the wall of valve housing 11 and in slide 13, respectively.

Furthermore, valves 1 and 2 need not absolutely be rigidly mechanically coupled together. For example, the area O–A in FIG. 3 may be a first stage for valve 1 where valve 2 on the whole does not move.

Another possibility is for valves 1 and 2 to be completely separated and coupled together only through their operating circuits. Valve 1 may then be of conventional form, while valve 2 may be similar to the valve shown in U.S. Pat. No. 4,027,699, the different partial valves then being provided with some form of slots in the piston or valve housing corresponding to slots 9 in FIG. 2.

What is claimed is:

1. Control valve for connecting a plurality of fluid demand locations having a total area to a common feed device, comprising
   (a) a valve housing;
   (b) a main regulating valve for the total flow to said demand locations;
   (c) a second valve coupled to said main regulating valve and comprising a plurality of valve means corresponding to the respective said demand locations;
   (d) each of said main regulating valve and said second valve being associated with slotted openings of such shape that opening of said control valve produces a steady increase in a well-defined opening area;
   (e) said main regulating valve and said second valve being so coupled together that, at a first degree of opening of said control valve, the total throughflow areas of the respective valves are equal; at a second degree of opening less than said first degree, the throughflow area of said main regulating valve exceeds that of said second valve; and at a third degree of opening greater than said first degree, the throughflow area of said second valve exceeds that of said main regulating valve.

2. Control valve according to claim 1, wherein, at said first degree of opening of said control valve, the said throughflow area of each of said valves is at least as great as the total area of the demand locations.

3. Control valve according to claim 1, wherein said main regulating valve and said second valve are adjustable with respect to one another.

4. Control valve according to claim 1, wherein said main regulating valve and said second valve are axially coupled sliding valves.

5. Control valve according to claim 1, including an adjustable slide in the valve housing for said second valve for the adjustment of the degree of opening of this valve relative to that of said main regulating valve.

6. Control valve according to claim 1, wherein said main regulating valve and said second valve are mechanically coupled together.

7. Control valve according to claim 1, wherein said slotted openings are provided in at least one of said main regulation valve and said second valve.

* * * * *

UNITED STATES PATENT AND TRADEMARK OFFICE
CERTIFICATE OF CORRECTION

PATENT NO. : 4,164,962
DATED : August 21, 1979
INVENTOR(S) : Nils-Erik Söderberg It is certified that error appears in the above-identified patent and that said Letters Patent are hereby corrected as shown below:

Please correct the subject patent as follows:

Inventor's name, change to read

--Nils-Erik Söderberg--

Signed and Sealed this

Thirteenth Day of January 1981

[SEAL]

Attest:

SIDNEY A. DIAMOND

Attesting Officer

Commissioner of Patents and Trademarks